(12) United States Patent
Cevallos Navarrete et al.

(10) Patent No.: US 12,542,224 B2
(45) Date of Patent: Feb. 3, 2026

(54) WIRELINE AND SLICKLINE CABLES FOR DOWNHOLE OPERATIONS

(71) Applicant: Schlumberger Technology Corporation, Sugar Land, TX (US)

(72) Inventors: Antonio Mauricio Cevallos Navarrete, Missouri City, TX (US); Joseph Varkey, Richmond, TX (US); Burcu Unal Altintas, Richmond, TX (US); Piljae Joo, Richmond, TX (US); Tam Tran, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 111 days.

(21) Appl. No.: 18/442,285

(22) Filed: Feb. 15, 2024

(65) Prior Publication Data

US 2024/0274324 A1 Aug. 15, 2024

Related U.S. Application Data

(60) Provisional application No. 63/485,080, filed on Feb. 15, 2023.

(51) Int. Cl.
| | | |
|---|---|---|
| *H01B 11/18* | (2006.01) | |
| *H01B 7/00* | (2006.01) | |
| *H01B 7/18* | (2006.01) | |

(52) U.S. Cl.
CPC ....... *H01B 11/1808* (2013.01); *H01B 7/0009* (2013.01); *H01B 7/1875* (2013.01)

(58) Field of Classification Search
CPC .......... H01B 7/225; H01B 7/226; H01B 9/04
See application file for complete search history.

(56) References Cited

U.S. PATENT DOCUMENTS

| | | |
|---|---|---|
| 6,600,108 B1 | 7/2003 | Mydur et al. |
| 7,170,007 B2 | 1/2007 | Varkey et al. |
| 7,188,406 B2 | 3/2007 | Varkey et al. |

(Continued)

OTHER PUBLICATIONS

ResMart Ultra PK6, URL: https://resmart.com/resmart-ultra-pk6.html, 3 pages.

(Continued)

*Primary Examiner* — Chau N Nguyen
(74) *Attorney, Agent, or Firm* — Jeffrey D. Frantz (57) ABSTRACT

In some embodiments, a cable can include an electrically conductive inner core. A first insulation layer can be disposed about the inner core. An electrically conductive layer can be disposed about the first insulation layer. A second insulation layer can be disposed about the electrically conductive layer. A first polymer jacket can be disposed about the second insulation layer. The first polymer jacket can include a first layer of armor strength members disposed therein. A second polymer jacket can be disposed about the first polymer jacket. The second polymer jacket can include a second layer of armor strength members disposed therein. An outer polymer jacket can be disposed about the second polymer jacket. At least one of the first polymer jacket, the second polymer jacket, and the outer polymer jacket can be formed from an aliphatic polyketone polymer, an ethylene-propylene copolymer, a polyolefin elastomer, a polypropylene, or a cross-linkable polyethylene.

9 Claims, 2 Drawing Sheets

(56) References Cited

U.S. PATENT DOCUMENTS

| | | | |
|---|---|---|---|
| 7,402,753 | B2 | 7/2008 | Varkey et al. |
| 7,586,042 | B2 | 9/2009 | Varkey et al. |
| 7,700,880 | B2 | 4/2010 | Varkey et al. |
| 7,793,409 | B2 | 9/2010 | Varkey |
| 8,227,697 | B2 | 7/2012 | Varkey et al. |
| 8,807,225 | B2 | 8/2014 | Varkey et al. |
| 9,140,115 | B2 | 9/2015 | Varkey et al. |
| 9,679,677 | B2 | 6/2017 | Varkey et al. |
| 10,262,770 | B2 | 4/2019 | Varkey et al. |
| 11,315,706 | B2 | 4/2022 | Varkey et al. |
| 2012/0222869 | A1* | 9/2012 | Varkey .................. D07B 1/147 166/385 |
| 2013/0206314 | A1* | 8/2013 | Varkey ................ H01B 13/148 156/52 |
| 2015/0294763 | A1* | 10/2015 | Varkey .................... H01B 3/30 385/101 |
| 2019/0279786 | A1* | 9/2019 | Varkey .................. H01B 7/046 |
| 2021/0210252 | A1* | 7/2021 | Varkey ................ H01B 7/1895 |
| 2022/0143879 | A1* | 5/2022 | Walker .................... B29C 44/60 |
| 2023/0402206 | A1* | 12/2023 | Protasov ............. H01B 7/1875 |

OTHER PUBLICATIONS

ResMart Ultra PK6R, URL: https://resmart.com/resmart-ultra-pk6r.html, 3 pages.

\* cited by examiner

WIRELINE AND SLICKLINE CABLES FOR DOWNHOLE OPERATIONS

CROSS REFERENCE TO RELATED APPLICATION

This application claims priority to U.S. Provisional Patent Application No. 63/485,080, filed on Feb. 15, 2023, which is incorporated by reference herein.

FIELD

Embodiments described generally relate to wireline and slickline cables for downhole operations. More particularly, such embodiments relate to wireline and slickline cables that include an inner jacket, an intermediate jacket, and an outer jacket, where at least one jacket is formed from an aliphatic polyketone polymer, an ethylene-propylene copolymer, a polyolefin elastomer, a polypropylene, or a cross-linkable polyethylene.

BACKGROUND

Polymers are one of the key material components in the manufacture of wireline and slickline cables. The particular mechanical properties of the polymer can directly affect the cable performance when in a downhole environment. Conventional polymers used in the manufacture of wireline or digital slickline cables are fluor-based polymers such as ETFE, PFA, FEP, polyolefin-based polymers such as LDPE, HDPE, and TPX and poly-condensates such as PEEK and PPS.

While the conventional polymers have been used to produce wireline and slickline cables, such polymers have some disadvantages. One disadvantage is that some of the conventional polymers are expensive and, thus, incur relatively high manufacturing costs. Another disadvantage is that the conventional polymers have a relatively high density, which increases the weight of the cable. Still another disadvantage is that the conventional polymers are subject to damage due to abrasion when used in operations.

There is a need, therefore, for improved wireline and slickline cables.

SUMMARY

Cables are provided. In some embodiments, the cable can include an electrically conductive inner core. A first insulation layer can be disposed about the inner core. An electrically conductive layer can be disposed about the first insulation layer. A second insulation layer can be disposed about the electrically conductive layer. A first polymer jacket can be disposed about the second insulation layer. The first polymer jacket can include a first layer of armor strength members disposed therein. A second polymer jacket can be disposed about the first polymer jacket. The second polymer jacket can include a second layer of armor strength members disposed therein. An outer polymer jacket can be disposed about the second polymer jacket. At least one of the first polymer jacket, the second polymer jacket, and the outer polymer jacket can be formed from an aliphatic polyketone polymer, an ethylene-propylene copolymer, a polyolefin elastomer, a polypropylene, or a cross-linkable polyethylene.

In some embodiments, the cable can include an electrically conductive inner core. An insulation layer can be disposed about the inner core. A first polymer jacket can be disposed about the insulation layer. The first polymer jacket can include at least one layer of armor strength members disposed therein. An outer polymer jacket can be disposed about the first polymer jacket. At least one of the first polymer jacket and the outer polymer jacket can be formed from an aliphatic polyketone polymer, an ethylene-propylene copolymer, a polyolefin elastomer, a polypropylene, or a cross-linkable polyethylene.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions can be made to achieve certain goals, such as compliance with system-related and/or operation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the claimed subject matter are discussed below. These examples are not intended to limit the scope of the disclosure. Indeed, the present disclosure may encompass a variety of forms that may be similar to or different from the examples set forth below.

It should be understood that the formation of a first feature about, over, or on a second feature in the description that follows includes embodiments in which the first and second features are formed in direct contact and also includes embodiments in which additional features are formed interposing the first and second features, such that the first and second features are not in direct contact or directly adjacent to one another. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Overview

Wireline cables and slickline cables, collectively referred to herein simply as "cable" are provided. In some embodiments, the cable can be a coaxial cable. In such embodiment, the cable can include an electrically conductive inner core. A first insulation layer can be disposed about the inner core. An electrically conductive layer can be disposed about the insulation layer. A second insulation layer can be disposed about the electrically conductive layer. A first polymer jacket can be disposed about the second insulation layer. The first polymer jacket can include a first layer of armor strength members disposed therein. A second polymer jacket can be disposed about the first polymer jacket. The second polymer jacket can include a second layer of armor strength members disposed therein. A third or an outer polymer jacket can be disposed about the second polymer jacket. At least one, at least two, or each of the first polymer jacket, the second polymer jacket, and the outer polymer jacket can be formed from an aliphatic polyketone polymer, an ethylene-propylene copolymer, a polyolefin elastomer, a polypropylene, or a cross-linkable polyethylene.

In other embodiments, the cable can be a mono cable. In such embodiment, the cable can include an electrically conductive inner core. An insulation layer can be disposed about the inner core. A first polymer jacket can be disposed about the insulation layer. The first polymer jacket can include a one or more layers of armor strength members disposed therein. A second or an outer polymer jacket can be disposed about the first polymer jacket. At least one or each of the first polymer jacket and the outer polymer jacket can be formed from an aliphatic polyketone polymer, an ethylene-propylene copolymer, a polyolefin elastomer, a polypropylene, or a cross-linkable polyethylene.

The electrically conductive inner core in the coaxial cable and/or the mono cable can be configured to transmit electricity therethrough. In some embodiments, the electrically conductive inner core can include 1, 2, 3, 4, 5, 6, 7, or more electrically conductive wires. In some embodiments, one or more of the electrically conductive wires can be a solid wire. In other embodiments, one or more of the electrically conductive wires can be composed of or otherwise include a plurality of individual strands that can be helixed together at a suitable lay angle to form the one or more electrically conductive wires in the inner core. As such, in some embodiments, each electrically conductive wire can be a solid wire, composed of a plurality of individual strands, or a combination of one or more electrically conductive wires that can be a solid wire and one or more electrically conductive wires that can be composed of a plurality of individual strands.

When the electrically conductive inner core includes two or more electrically conductive wires, such wires can be helixed together at a suitable lay angle to form the electrically conductive inner core. In some embodiments, the electrically conductive wire(s) in the electrically conductive inner core can be or can include one or more metals and/or metal alloys. In some embodiments, the metal and/or metal alloy can be or can include, but is not limited to, copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, or any combination thereof.

The first insulation layer in the coaxial cable and/or the insulation layer in the mono cable can insulate an electrical charge in the electrically conductive inner core. In some embodiments, the first insulation layer in the coaxial cable and/or the insulation layer in the mono cable can include one, two, three, four, or more discrete insulation layers such that when the cable includes two or more discrete layers, the two or more discrete layers together can provide the insulation layer. When the insulation layer includes two or more discrete insulation layers, each layer can have the same composition or different compositions with respect to one another. In some embodiments, the insulation layer(s) can be or can include any insulating material such as a polymer or other material commonly used for insulating electrical conductors. Examples of insulating materials can be or can include, but are not limited to, rubber, vulcanized rubber (VIR), polyethylene (PE), cross-linked polyethylene (XLPE), ethylene propylene rubber (EPR), asbestos, thermoplastic(s), varnished cambric material, impregnated paper, polyvinyl chloride (PVC), other low conductive materials, or any mixture or combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any mixture or combination thereof.

In some embodiments, the electrically conductive layer disposed about the first insulation layer in the coaxial cable can be or can include one or more layers that each include a plurality of helically wound metal wires disposed about the first insulation layer. In other embodiments, the electrically conductive layer disposed about the first insulation layer in the coaxial cable can be or can include one or more layers formed from a metal tube or foil that can be disposed about and drawn down around the first insulation layer and, if foil, can be welded along the seam. In some embodiments, when the electrically conductive layer disposed about the first insulation layer in the coaxial cable includes a plurality of metal wires, the metal wires in the electrically conductive layer(s) can be solid wires, stranded wires, or a combination of both solid and stranded wires. In some embodiments, when the electrically conductive wires in the electrically conductive layer disposed about the first insulation layer in the coaxial cable include a plurality of stranded wires, such wires can include two, three, four, five, six, seven, eight, nine, ten, or more individual strands helixed together at a suitable lay angle to form one of the metal wires. In some embodiments, the coaxial cable can include one, two, three, four, or more layers of helically wound metal strands disposed about the insulation layer(s).

The electrically conductive layer disposed about the first insulation layer in the coaxial cable can be made from any suitable metal or metal alloy. In some embodiments, the metal or metal alloy can be or can include, but is not limited to, copper, copper-covered steel, beryllium-copper based alloys, nickel-chromium based alloys, superaustenitic stainless steel alloys, nickel-cobalt based alloys, copper-nickel-tin based alloys, nickel-molybdenum-chromium based alloys, tinned copper, aluminum, nickel, silver, copper-covered aluminum, other metal conductors, other metal alloy conductors, and combinations thereof. When the coaxial cable includes the two or more layers of helically wound metal wires, each layer can be made from the same metal or same combination of metals or different metals or different combinations of metals with respect to one another.

In the coaxial cable, the second insulation layer and the first insulation layer together can insulate an electrical charge in the electrically conductive layer disposed about the first insulation layer. In some embodiments, the second insulation layer in the coaxial cable can include one, two, three, four, or more discrete layers such that when the second insulation layer includes two or more discrete insulation layers, the two or more discrete insulation layers together can provide the second insulation layer. When the second insulation layer in the coaxial cable includes two or more discrete insulation layers, each layer can have the same composition or different compositions with respect to one another. In some embodiments, the second insulation layer(s) in the coaxial cable can be or can include any insulating material such as a polymer or other material commonly used for insulating electrical conductors. Examples of insulating materials can be or can include, but are not limited to, rubber, vulcanized rubber (VIR), polyethylene (PE), cross-linked polyethylene (XLPE), ethylene propylene rubber (EPR), asbestos, thermoplastic(s), varnished cambric material, impregnated paper, polyvinyl chloride (PVC), other low conductive materials, or any mixture or combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any mixture or combination thereof.

The first polymer jacket disposed about the second insulation layer in the coaxial cable and/or the first polymer jacket disposed about the insulation layer in the mono cable can include at least one layer of armor strength members at least partially or completely disposed therein. In some embodiments, the polymer in the first polymer jacket in the coaxial cable and/or the mono cable can be or can include, but is not limited to, (i) an aliphatic polyketone polymer, an ethylene-propylene copolymer, a polyolefin elastomer, a polypropylene, or a cross-linkable polyethylene or (ii) one more different polymers. Suitable different polymers can be or can include, but are not limited to, polyolefins, rubber, polyether ether ketone (PEEK), polyaryl ether ketone (PAEK), polyphenylene sulfide, polymers of ethylene-tetrafluoroethylene, polymers of poly(1,4-phenylene), polytetrafluoroethylene, perfluoroalkoxy polymers, fluorinated ethylene propylene, perfluoromethoxy polymers, other suitable polymeric materials, and any combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any combination thereof.

In some embodiments, the first layer of armor strength members in the first polymer jacket disposed about the second insulation layer in the coaxial cable and/or the layer of armor-strength members in the first polymer jacket disposed about the insulation layer in the mono cable can be made from any suitable metal, alloy, or composite material. Suitable metals or alloys can be or can include, but are not limited to, galvanized improved plow steel (with a variety of strength ratings), high-carbon steel, 27-7 Molybdenum, high modulus steel strength members, and the like. In some embodiments, the armor strength members can be formed from cold-drawn plow ferritic steel and can optionally be coated with zinc for corrosion protection. In some embodiments, the armor strength members can be insulated or made of a low-conductive material, such as nylon. In other embodiments, the armor strength members can be arranged such that the armor strength members disposed within the first polymer jacket can be helically disposed about the second insulation layer in the coaxial cable or the insulation layer in the mono cable. The armor strength members can be solid armor wire, stranded armor wire, or a combination of both solid and stranded armor wire. In some embodiments, stranded armor wires can include two, three, four, five, six, seven, eight, nine, ten, or more individual strands helixed together at a suitable lay angle.

In some embodiments, a first portion of the polymer used to form the first polymer jacket can be disposed, e.g., extruded, about the second insulation layer in the coaxial cable and/or the insulation layer in the mono cable to form a first portion of the first polymer jacket, the first layer of armor strength members can be disposed about the first portion of the first polymer jacket, and a second portion of the polymer used to form the first polymer jacket can be disposed, e.g., extruded, about the layer of armor strength members to form the first polymer jacket. In other embodiments, the polymer used to form the first polymer jacket in the coaxial cable and/or the mono cable can be disposed, e.g., extruded, about the second insulation layer in the coaxial cable or the insulation layer in the mono cable and the first layer of armor strength members can be disposed about the polymer used to form the first polymer jacket and can be caused to be at least partially or entirely embedded within the polymer used to form the first polymer jacket to form the first polymer jacket. For example, the polymer used to form the first polymer jacket, once disposed about the second insulation layer in the coaxial cable and/or the insulation layer in the mono cable, can be heated and at least partially melted during assembly of the cable such that the first layer of armor strength members can be rolled or otherwise urged into the polymer to form the first polymer jacket that can include the layer of armor strength members therein.

The second polymer jacket disposed about the first polymer jacket in the coaxial cable can include a second layer of armor strength members at least partially or completely disposed therein. In some embodiments, the polymer in the second polymer jacket in the coaxial cable can be or can include, but is not limited to, (i) an aliphatic polyketone polymer, an ethylene-propylene copolymer, a polyolefin elastomer, a polypropylene, or a cross-linkable polyethylene or (ii) one more different polymers. Illustrative different polymers can be or can include, but are not limited to, polyolefins, rubber, polyether ether ketone (PEEK), polyaryl ether ketone (PAEK), polyphenylene sulfide, polymers of ethylene-tetrafluoroethylene, polymers of poly(1,4-phenylene), polytetrafluoroethylene, perfluoroalkoxy polymers, fluorinated ethylene propylene, perfluoromethoxy polymers, other suitable polymeric materials, and any combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any combination thereof.

In some embodiments, the second layer of armor strength members in the second polymer jacket disposed about the first polymer jacket in the coaxial cable can be made from any suitable metal, alloy, or composite material. Suitable metals or alloys can be or can include, but are not limited to, galvanized improved plow steel (with a variety of strength ratings), high-carbon steel, 27-7 Molybdenum, high modulus steel strength members, and the like. In some embodiments, the second layer of armor strength members can be formed from cold-drawn plow ferritic steel and can optionally be coated with zinc for corrosion protection. In some embodiments, the armor strength members disposed within the second polymer jacket can be insulated or made of a low-conductive material, such as nylon. In other embodiments, the second layer of armor strength members disposed within the second polymer jacket can be arranged such that the armor strength members can be helically disposed about the first polymer jacket. In some embodiments, the armor strength members in the second polymer jacket can be at an opposite helix as compared to the armor strength members in the first polymer jacket. The second layer of armor strength members can be solid armor wire, stranded armor wire, or a combination of both solid and stranded armor wire. In some embodiments, stranded armor wires can include two, three, four, five, six, seven, eight, nine, ten, or more individual strands helixed together at a suitable lay angle.

In some embodiments, a first portion of the polymer used to form the second polymer jacket in the coaxial cable can be disposed, e.g., extruded, about the first polymer jacket to form a first portion of the second polymer jacket, the second layer of armor strength members can be disposed about the first portion of the second polymer jacket, and a second portion of the polymer used to form the second polymer jacket can be disposed, e.g., extruded, about the second layer of armor strength members to form the second polymer jacket. In other embodiments, the polymer used to form the second polymer jacket in the coaxial cable can be disposed, e.g., extruded, about the first polymer jacket and the second layer of armor strength members can be disposed about the polymer used to form the second polymer jacket and can be caused to be at least partially or entirely embedded within the polymer used to form the second polymer jacket to form the second polymer jacket. For example, the polymer used to form the second polymer jacket in the coaxial cable, once disposed about the first polymer jacket, can be heated and at least partially melted during assembly of the cable such that the second layer of armor strength members can be rolled or otherwise urged into the polymer to form the second polymer jacket.

The outer polymer jackets in the coaxial cable and/or the mono cable can be disposed, e.g., extruded, about the second polymer jacket or the first polymer jacket to produce the coaxial cable and the mono cable, respectively. In some embodiments, the polymer in the outer polymer jacket can be or can include, but is not limited to, (i) an aliphatic polyketone polymer, an ethylene-propylene copolymer, a polyolefin elastomer, a polypropylene, or a cross-linkable polyethylene or (ii) one more different polymers. Illustrative different polymers can be or can include, but are not limited to, polyolefins, rubber, polyether ether ketone (PEEK), polyaryl ether ketone (PAEK), polyphenylene sulfide, polymers of ethylene-tetrafluoroethylene, polymers of poly(1,4-phenylene), polytetrafluoroethylene, perfluoroalkoxy polymers, fluorinated ethylene propylene, perfluoromethoxy polymers, other suitable polymeric materials, and any combination thereof. Illustrative rubber can be or include, but is not limited to, thermoplastic rubber, neoprene (polychloroprene), styrene butadiene rubber (SBR), silicone, natural rubber, ethylene propylene diene monomer (EPDM), ethylene propylene rubber (EPR), chlorosulfonated polyethylene (CSPE), other thermoset rubber, any other type of rubber, or any combination thereof.

In some embodiments, the polymer used to form the first polymer jacket, the polymer used to form second polymer jacket, and/or the polymer used to form the outer polymer jacket in the coaxial cable can be fiber reinforced. In some embodiments, the polymer used to form the first polymer jacket and/or the polymer used to form the outer polymer jacket in the mono cable can be fiber reinforced. The fibers that can be used to reinforce the polymer jacket(s) in the coaxial cable and/or the mono cable can be or can include, but are not limited to, glass fibers, carbon fibers, ceramic fibers, para-aramid fibers, aromatic polyester fibers, or combinations thereof. In at least some embodiments, the fibers used to reinforce one or more of the polymer jackets can be glass fibers and/or carbon fibers. In some embodiments, an amount of the fibers in the fiber reinforced polymer jacket(s) can be about 1 wt %, about 3 wt %, about 5 wt %, or about 10 wt % to about 15 wt %, about 20 wt %, about 25 wt %, or about 30 wt %, based on a combined weight of the fibers and the polymer in the jacket(s). The fibers can have any desired length and any desired diameter.

In some embodiments, commercially available aliphatic polyketone polymers can be or can include, but are not limited to, PK6 and PK6R, available from ResMart, RTP-4599 X 150576 B EG (PK/silicone lubricated), available from RTP Co., or any combination thereof. In some embodiments, commercially available polyolefin elastomers can include one or more of the polyolefin elastomers available from Dow Inc. under the name ENGAGE®.

In some embodiments, the polymer used to form any one or more of the polymer jackets in the coaxial cable and/or the mono cable can have a density of less than 1.3 g/cm$^3$, less than 1.29 1.3 g/cm$^3$, less than 1.28 g/cm$^3$, less than 1.27 g/cm$^3$, less than 1.26, or less than 1.25 g/cm$^3$, or less than 1.24 g/cm$^3$, as measured according to ASTM D792-20. In some embodiments, the polymer used to form any one or more of the polymer jackets in the coaxial cable and/or the mono cable can have a melt temperature of 130° C., 140° C., 150° C., 170° C., 180° C., 190° C., 200° C., or 210° C. to 230° C., 240° C., 250° C., 260° C., 270° C., 280° C., 290° C., or 300° C., as measured according to ASTM D1238-10. In some embodiments, the polymer used to form any one or more of the polymer jackets in the coaxial cable and/or the mono cable can have a tensile strength of 7,000 psi, 7,250 psi, 7,500 psi, 7,750 psi, 8,000 psi, 8,250 psi, 8,500 psi, 8,750 psi, or 9,000 psi to 9,250 psi, 9,500 psi, 9,750 psi, 10,000 psi, 10,500 psi, 11,000 psi, 11,500 psi, 12,000 psi, 12,500 psi, or 13,000 psi, as measured according to ASTM D638-14.

In some embodiments, the polymer used to form any one or more of the polymer jackets in the coaxial cable and/or the mono cable can have a heat deflection temperature (HDT) at 264 psi unannealed of 105° C., 107° C., 110° C., 112° C., or 115° C. to 120° C., 125° C., 130° C., 135° C., 140° C., 145° C., 150° C., or 155° C., as measured according to ASTM D648-18. In some embodiments, the polymer used to form any one or more of the polymer jackets in the coaxial cable and/or the mono cable can have a Rockwell hardness at least 98, at least 99, at least 100, at least 101, at least 102, at least 103, at least 104, or at least 105 to 106, 107, 108, 109, or 110, as measured according to ASTM D785-08 (2015).

In some embodiments, the polymer used to form the first polymer jacket, the polymer used to form any one or more of the polymer jackets in the coaxial cable and/or the mono cable can have an elongation break of greater than 150%, greater than 175%, greater than 200%, greater than 215%, or greater than 225%. In some embodiments, the polymer used to form any one or more of the polymer jackets in the coaxial cable and/or the mono cable can have an elongation break of 160%, 180%, 200%, or 215% to 220%, 230%, 240%, 250%, 260%, or 270%. In some embodiments, the elongation break can be measured from injection, compression molded, or extruded tensile bar specimens of the polymer jacket material alone. In other embodiments, the elongation break can be measured from injection, compression molded, or extruded tensile bar specimens of the polymer jacket material, e.g., a reinforced polymer that includes carbon fiber and/or man-made fibers. In some embodiments, the elongation at break can be measured according to ASTM D638-14.

In some embodiments, the polymer used to form any one or more of the polymer jackets in the coaxial cable and/or the mono cable, whether such polymer has been reinforced with fibers or not, can have a tensile elongation of greater than 9%, greater than 10%, greater than 13%, greater than 15%, greater than 17%, greater than 20%, greater than 22%, or greater than 23%. In some embodiments, the polymer used to form any one or more of the polymer jackets in the coaxial cable and/or the mono cable, whether such polymer has been reinforced with fibers or not, can have a tensile elongation of greater than 9%, greater than 10%, greater than 13%, greater than 15%, greater than 17%, greater than 20%, greater than 22%, or greater than 23% to 24%, 26%, 28%, 30%, 33%, or 35%. In some embodiments, the polymer used to form the first polymer jacket in the coaxial cable and/or the mono cable, whether such jacket has been reinforced with fibers or not, can have a tensile elongation of greater than 9%. In some embodiments, the polymer used to form the second polymer jacket in the coaxial cable, whether such jacket has been reinforced with fibers or not, can have a tensile elongation of greater than 9%. In some embodiments, the polymer used to form the outer polymer jacket in the coaxial cable and/or the mono cable, whether such jacket has been reinforced with fibers or not, can have a tensile elongation of greater than 9%. In some embodiments, the polymer used to form the first polymer jacket and the polymer used to form second polymer jacket in the coaxial cable, whether such jackets have been reinforced with fibers or not, can each have a tensile elongation of greater than 9%. In some embodiments, the polymer used to form the first polymer jacket and the polymer used to form the outer polymer jacket in the coaxial cable, whether such jackets have been reinforced with fibers or not, can each have a tensile elongation of greater than 9%. In some embodiments, the polymer used to form the second polymer jacket and the polymer used to form the outer polymer jacket in the coaxial cable, whether such jackets have been reinforced with fibers or not, can each have a tensile elongation of greater than 9%.

In some embodiments, the polymer used to form the first polymer jacket, the polymer used to form second polymer jacket, and the polymer used to form the outer polymer jacket in the coaxial cable, whether such jackets have been reinforced with fibers or not, can each have a tensile elongation of greater than 9%. In some embodiments, the polymer used to form the first polymer jacket and the polymer used to form the outer polymer jacket in the mono cable, whether such jackets have been reinforced with fibers or not, can each have a tensile elongation of greater than 9%. In some embodiments, the tensile elongation can be measured from injection, compression molded, or extruded tensile bar specimens of the polymer jacket material alone. In other embodiments, the tensile elongation can be measured from injection, compression molded, or extruded tensile bar specimens of the polymer jacket material reinforced with the fibers. The tensile elongation can be measured according to ASTM D638-14. The tensile elongation can be adjusted by controlling the fiber length and/or fiber concentration.

In some embodiments, the polymer used to form the first polymer jacket, the polymer used to form second polymer jacket, and/or the polymer used to form the outer polymer jacket in the coaxial cable and/or the polymer used to form the first polymer jacket and/or the polymer used to form the outer polymer jacket in the mono cable can have at least one, at least two, at least three, at least four, at least five, at least six, or at least seven of: (i) a density of less than 1.3 g/cm$^3$, less than 1.29 1.3 g/cm$^3$, less than 1.28 g/cm$^3$, less than 1.27 g/cm$^3$, less than 1.26, or less than 1.25 g/cm$^3$, or less than 1.24 g/cm$^3$; (ii) a melt temperature of 130° C., 140° C., 150° C., 170° C., 180° C., 190° C., 200° C., or 210° C. to 230° C., 240° C., 250° C., 260° C., 270° C., 280° C., 290° C., or 300° C.; (iii) a tensile strength of 7,000 psi, 7,250 psi, 7,500 psi, 7,750 psi, 8,000 psi, 8,250 psi, 8,500 psi, 8,750 psi, or 9,000 psi to 9,250 psi, 9,500 psi, 9,750 psi, 10,000 psi, 10,500 psi, 11,000 psi, 11,500 psi, 12,000 psi, 12,500 psi, or 13,000 psi; (iv) a heat deflection temperature (HDT) at 264 psi unannealed of 105° C., 107° C., 110° C., 112° C., or 115° C. to 120° C., 125° C., 130° C., 135° C., 140° C., 145° C., 150° C., or 155° C.; (v) a Rockwell hardness at least 98, at least 99, at least 100, at least 101, at least 102, at least 103, at least 104, or at least 105 to 106, 107, 108, 109, or 110; (vi) an elongation break of greater than 150%, greater than 175%, greater than 200%, greater than 215%, or greater than 225%; and/or (vii) a tensile elongation of greater than 9%, greater than 10%, greater than 13%, greater than 15%, greater than 17%, greater than 20%, greater than 22%, or greater than 23%.

In some embodiments, the polymer used to form the first polymer jacket, the polymer used to form second polymer jacket, and/or the polymer used to form the outer polymer jacket in the coaxial cable and/or the polymer used to form the first polymer jacket and/or the polymer used to form the outer polymer jacket in the mono cable can be the aliphatic polyketone polymer and such jacket can have at least one, two, at least three, at least four, at least five, at least six, or at least seven of: (i) a density of less than 1.3 g/cm$^3$, less than 1.29 1.3 g/cm$^3$, less than 1.28 g/cm$^3$, less than 1.27 g/cm$^3$, less than 1.26, or less than 1.25 g/cm$^3$, or less than 1.24 g/cm$^3$; (ii) a melt temperature of 130° C., 140° C., 150° C., 170° C., 180° C., 190° C., 200° C., or 210° C. to 230° C., 240° C., 250° C., 260° C., 270° C., 280° C., 290° C., or 300° C.; (iii) a tensile strength of 7,000 psi, 7,250 psi, 7,500 psi, 7,750 psi, 8,000 psi, 8,250 psi, 8,500 psi, 8,750 psi, or 9,000 psi to 9,250 psi, 9,500 psi, 9,750 psi, 10,000 psi, 10,500 psi, 11,000 psi, 11,500 psi, 12,000 psi, 12,500 psi, or 13,000 psi;

(iv) a heat deflection temperature (HDT) at 264 psi unannealed of 105° C., 107° C., 110° C., 112° C., or 115° C. to 120° C., 125° C., 130° C., 135° C., 140° C., 145° C., 150° C., or 155° C.; (v) a Rockwell hardness at least 98, at least 99, at least 100, at least 101, at least 102, at least 103, at least 104, or at least 105 to 106, 107, 108, 109, or 110; (vi) an elongation break of greater than 150%, greater than 175%, greater than 200%, greater than 215%, or greater than 225%; and/or (vii) a tensile elongation of greater than 9%, greater than 10%, greater than 13%, greater than 15%, greater than 17%, greater than 20%, greater than 22%, or greater than 23%.

In some embodiments, the electrically conductive inner core in the coaxial cable and/or the mono cable can include a filler material disposed about the one or more electrically conductive wires. In such embodiment, the filler material can fill at least a portion of any interstitial space located between the outer surface of the one or more electrically conductive wires and the inner surface of the insulation layer disposed about the one or more electrically conductive wires. Similarly, in some embodiments, the electrically conductive layer disposed about the first insulation layer in the coaxial cable can include a filler material disposed about the electrically conductive wires. In such embodiment, the filler material can fill at least a portion of any interstitial space located between the outer surface of the electrically conductive wires and the outer surface of the first insulation layer and the inner surface of the second insulation layer the electrically conductive layer can be disposed between. In some embodiments, the filler material can be or can include, but is not limited to, silicone, ethylene propylene diene monomer rubber, a fluorosilicone, or a mixture thereof.

Figure 1:
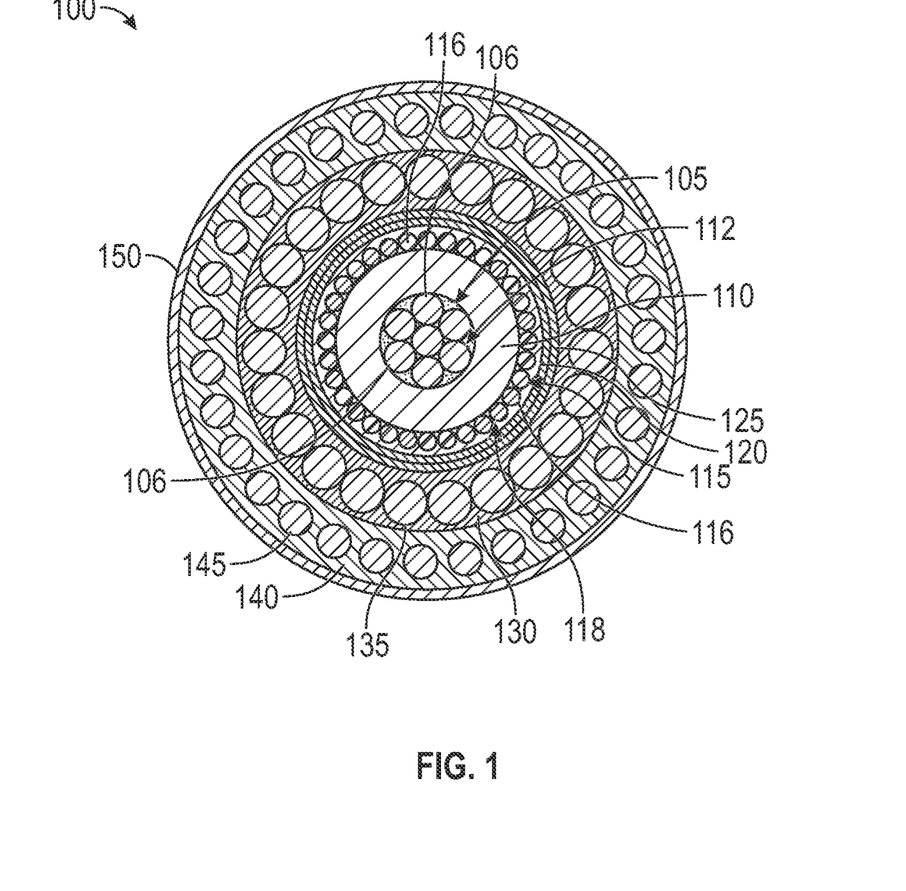
FIG. 1 depicts an illustrative coaxial cable that includes an inner jacket, an intermediate jacket and an outer jack disposed about an electrically conductive inner core, where at least one of the jackets can be composed of an aliphatic polyketone polymer, an ethylene-propylene copolymer, a polyolefin elastomer, a polypropylene, or a cross-linkable polyethylene, according to one or more embodiments described.

FIG. 1. depicts an illustrative coaxial cable 100 that includes an inner jacket 130, an intermediate jacket 140, and an outer jack 150 disposed about an electrically conductive inner core 105, where at least one of the jackets 130, 140, 150 can be composed of an aliphatic polyketone polymer, an ethylene-propylene copolymer, a polyolefin elastomer, a polypropylene, or a cross-linkable polyethylene, according to one or more embodiments. As shown, the electrically conductive inner core 105 can include a plurality of discrete electrically conductive wires 106. In some embodiments, the electrically conductive wires 106 can be helically disposed with respect to one another. In other embodiments, however, the electrically conductive inner core 105 can include a single electrically conductive wire and/or one or more electrically conductive wires that can be composed of multiple discrete electrically conductive strands.

The cable 100 can also include a first insulation layer 110 disposed about the inner core 105. As noted above, the first insulation layer 110 can include one or two or more separate or discrete layers. In some embodiments, a filler material 112 can optionally be disposed between the inner core 105 and the first insulation layer 110. The cable 100 can also include an electrically conductive layer 115 disposed about the first insulation layer 110. As shown, the electrically conductive layer 115 can be composed of a plurality of electrically conductive wires 116. In some embodiments, the electrically conductive wires 116 can be helically disposed about the first insulation layer 110.

The cable 100 can also include a second insulation layer (two are shown, 120, 125) disposed about the electrically conductive layer 115. As noted above, the second insulation layer can include one or two or more separate or discrete layers. In some embodiments, a filler material 118 can optionally be disposed within the electrically conductive layer 115 between the first insulation layer 110 and the second insulation layer 120.

The cable 100 can also include a first polymer jacket 130 disposed about the second insulation layer 125. The first polymer jacket 130 can include a first layer of armor strength members 135 disposed therein. The cable 100 can also include a second polymer jacket 140 disposed about the first polymer jacket 130. The second polymer jacket 140 can include a second layer of armor strength members 145 disposed therein. The cable 100 can also include an outer polymer jacket 150 disposed about the second polymer jacket 140. As described above, at least one of the first polymer jacket 130, the second polymer jacket 140, and the outer polymer jacket 150 can be formed from an aliphatic polyketone polymer, an ethylene-propylene copolymer, a polyolefin elastomer, a polypropylene, or a cross-linkable polyethylene.

In some embodiments, the cable 100 can be deployed into a downhole well. The cable 100 can be connected to one or more downhole tools (not shown). In some embodiments, the cable 100 can provide power to the one or more downhole tools. In some embodiments, the cable 100 can receive and transfer electrical signals to and/or from the one or more downhole tools connected thereto.

Figure 2:
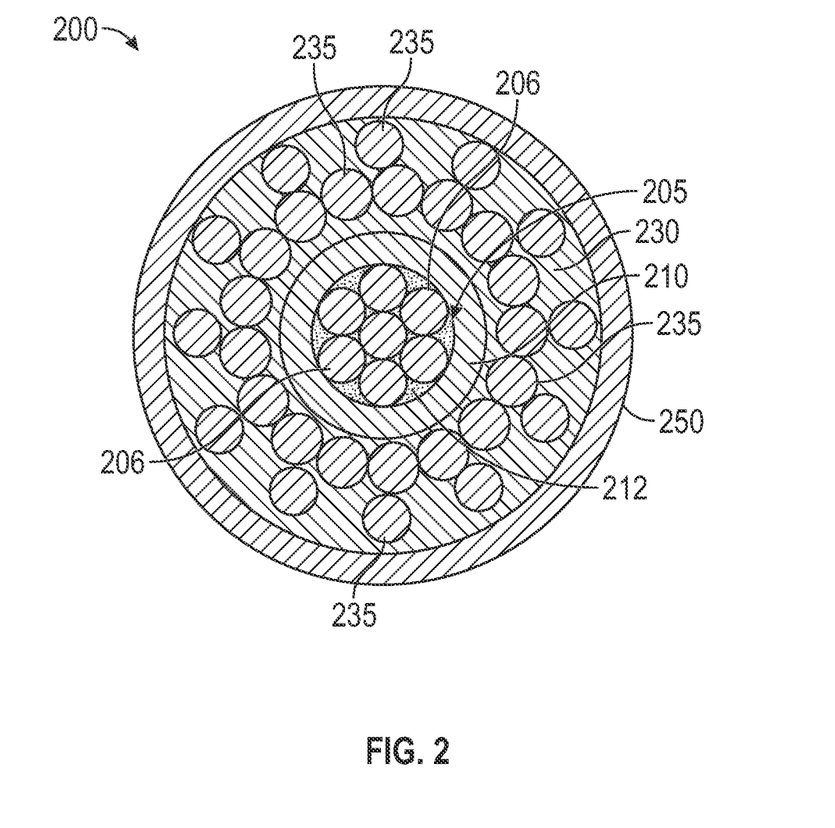
FIG. 2 depicts an illustrative mono cable that includes an inner jacket and an outer jack disposed about an electrically conductive inner core, where at least one of the jackets can be composed of an aliphatic polyketone polymer, an ethylene-propylene copolymer, a polyolefin elastomer, a polypropylene, or a cross-linkable polyethylene, according to one or more embodiments described.

FIG. 2 depicts an illustrative mono cable 200 that includes an inner jacket 230 and an outer jack 250 disposed about an electrically conductive inner core 205, where at least one of the jackets 230, 250 can be composed of an aliphatic polyketone polymer, an ethylene-propylene copolymer, a polyolefin elastomer, a polypropylene, or a cross-linkable polyethylene, according to one or more embodiments. As shown, the electrically conductive inner core 205 can include a plurality of discrete electrically conductive wires 206. In some embodiments, the electrically conductive wires 206 can be helically disposed with respect to one another. In other embodiments, however, the electrically conductive inner core 205 can include a single electrically conductive wire and/or one or more electrically conductive wires that can be composed of multiple discrete electrically conductive strands.

The cable 200 can also include an insulation layer 210 disposed about the inner core 205. As noted above, the insulation layer 210 can include one or two or more separate or discrete layers. In some embodiments, a filler material 212 can optionally be disposed between the inner core 205 and the insulation layer 210. The cable 100 can also include the first polymer jacket 230 disposed about the insulation layer 210. The first polymer jacket 230 can include a layer of armor strength members 235 disposed therein. As shown, the layer of armor strength members 235 can include one or more layers of the armor strength member 235 in which each armor strength member contacts one another and one or more layers that include armor strength members 235 spaced apart from one another within the first polymer jacket 230. In other embodiments, however, the armor strength members 235 can be disposed within the first polymer jacket 230 as a single layer and/or take any arrangement with respect to one another within the first polymer jacket 230.

The cable 200 can also include the outer polymer jacket 250 disposed about the first polymer jacket 230. As described above, at least one of the first polymer jacket 230 and the outer polymer jacket 250 can be formed from an aliphatic polyketone polymer, an ethylene-propylene copolymer, a polyolefin elastomer, a polypropylene, or a cross-linkable polyethylene.

In some embodiments, the cable 200 can be deployed into a downhole well. The cable 200 can be connected to one or more downhole tools (not shown). In some embodiments, the cable 200 can provide power to the one or more downhole tools. In some embodiments, the cable 200 can receive and transfer electrical signals to and/or from the one or more downhole tools connected thereto.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A cable, comprising:
   an electrically conductive inner core;
   a first insulation layer disposed about the inner core;
   an electrically conductive layer disposed about the first insulation layer;
   a second insulation layer disposed about the electrically conductive layer;
   a first polymer jacket disposed about the second insulation layer, wherein the first polymer jacket comprises a first layer of armor strength members disposed therein;
   a second polymer jacket disposed about the first polymer jacket, wherein the second polymer jacket comprises a second layer of armor strength members disposed therein; and
   an outer polymer jacket disposed about the second polymer jacket, wherein at least one of the first polymer jacket, the second polymer jacket, and the outer polymer jacket is formed from an aliphatic polyketone polymer, an ethylene-propylene copolymer, a polyolefin elastomer, a polypropylene, or a cross-linkable polyethylene,
   wherein an interstitial space located between an outer surface of the electrically conductive inner core and an inner surface of the first insulation layer, an interstitial space located between the electrically conductive layer and the first and second insulation layers, or both comprises a filler material disposed therein, and
   wherein the filler material comprises silicone, ethylene propylene diene monomer rubber, a fluorosilicone, or a mixture thereof.

2. The cable of claim 1, wherein the electrically conductive inner core comprises a plurality of metal wires helixed together at a suitable lay angle.

3. The cable of claim 1, wherein the first insulation layer is configured to insulate an electrical charge in the electrically conductive inner core.

4. The cable of claim 1, wherein the electrically conductive layer comprises a plurality of metal wires helically arranged about the first insulation layer.

5. The cable of claim 1, wherein the first and second insulation layers are configured to insulate an electrical charge in the electrically conductive layer.

6. The cable of claim 1, wherein the first layer of armor strength members disposed within the first polymer jacket and the second layer of armor strength members disposed within the second polymer jacket are at an opposite helix with respect to one another.

7. The cable of claim 1, wherein the polymer used to form the first polymer jacket, the second polymer jacket, and the outer polymer jacket has a tensile elongation of greater than 9%, measured according to ASTM D638-14.

8. The cable of claim 1, wherein at least one of: the polymer used to form the first polymer jacket, the polymer used to form the second polymer jacket, or the polymer used to form the outer polymer jacket is fiber reinforced.

9. The cable of claim 8, wherein the fibers comprise glass fibers, carbon fibers, ceramic fibers, para-aramid fibers, aromatic polyester fibers, or a combination thereof.

* * * * *